United States Patent
Hsieh

(10) Patent No.: US 9,416,315 B2
(45) Date of Patent: Aug. 16, 2016

(54) LIQUID CRYSTAL COMPOSITION, LIQUID CRYSTAL ALIGNMENT MIXTURE AND LIQUID CRYSTAL DISPLAY DEVICE

(71) Applicant: Shenzhen China Star Optoelectronics Technology Co., Ltd., Shenzhen (CN)

(72) Inventor: Chung-Ching Hsieh, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 13/805,672

(22) PCT Filed: Dec. 14, 2012

(86) PCT No.: PCT/CN2012/086642
§ 371 (c)(1),
(2) Date: Dec. 20, 2012

(87) PCT Pub. No.: WO2014/089821
PCT Pub. Date: Jun. 19, 2014

(65) Prior Publication Data
US 2015/0322340 A1 Nov. 12, 2015

(30) Foreign Application Priority Data
Dec. 12, 2012 (CN) .......................... 2012 1 0535505

(51) Int. Cl.
*C09K 19/42* (2006.01)
*C09K 19/54* (2006.01)
(Continued)

(52) U.S. Cl.
CPC ............. *C09K 19/3003* (2013.01); *C09K 19/42* (2013.01); *C09K 19/56* (2013.01); *G02F 1/1368* (2013.01); *G02F 1/133514* (2013.01); *G02F 1/133703* (2013.01); *G02F 1/133723* (2013.01);
(Continued)

(58) Field of Classification Search
CPC .... C09K 19/42; C09K 19/542; C09K 19/548; C09K 2019/0448; C09K 2019/3004; C09K 2219/03; Y10T 428/1005; Y10T 428/1023
See application file for complete search history.

(56) References Cited

U.S. PATENT DOCUMENTS 6,207,075 B1 * 3/2001 Muraoka ............ C09K 19/3001
252/299.63
6,495,218 B1 12/2002 Yamamoto et al.
(Continued)

FOREIGN PATENT DOCUMENTS

CN 1778867 A 5/2006
CN 101671252 A 3/2010
(Continued)

*Primary Examiner* — Shean C Wu
(74) *Attorney, Agent, or Firm* — Mark M. Friedman

(57) ABSTRACT

The present invention discloses a liquid crystal composition, a liquid crystal mixture and a liquid crystal panel. The liquid crystal composition comprises one or more types of first liquid crystal molecules substituted by difluoroalkenyl group and one or more types of second liquid crystal molecules for vertical alignment. The probability of polymerization between polymerizable monomers and the first liquid crystal molecules can be effectively reduced by the steric effect caused by the difluoroalkenyl group of the first liquid crystal molecules during a process of polymer alignment. Thus, the probability of polymerization occurred between the polymerizable monomers and polyimide on the surface of an alignment film is increased, so as to solve the problem of the image sticking.

5 Claims, 3 Drawing Sheets

(51) Int. Cl.
*C09K 19/30* (2006.01)
*G02F 1/1337* (2006.01)
*G02F 1/1368* (2006.01)
*G02F 1/1335* (2006.01)
*C09K 19/56* (2006.01)
*C09K 19/04* (2006.01)
*G02F 1/1333* (2006.01)

(52) U.S. Cl.
CPC .. *G02F 1/133788* (2013.01); *C09K 2019/0444* (2013.01); *C09K 2019/0448* (2013.01); *C09K 2019/3004* (2013.01); *G02F 2001/133397* (2013.01); *G02F 2001/133738* (2013.01); *Y10T 428/1005* (2015.01); *Y10T 428/1023* (2015.01)

(56) References Cited

U.S. PATENT DOCUMENTS 6,495,219 B1   12/2002   Fujita et al.
2002/0033472 A1   3/2002   Kato et al.
2006/0115606 A1   6/2006   Ichinose et al.
2007/0109466 A1*   5/2007   Choi ................ G02F 1/133377
                                           349/86
2008/0074598 A1*   3/2008   Ham ................... G02F 1/1337
                                           349/129
2009/0065739 A1*   3/2009   Haseba ............. C09K 19/0275
                                           252/299.62
2011/0058131 A1*   3/2011   Ishiguro ........... G02F 1/133632
                                           349/117
2012/0229744 A1*   9/2012   Hattori .................... C08F 2/50
                                           349/124

FOREIGN PATENT DOCUMENTS

CN   102517038 A   6/2012
EP   1038940 A1   9/2000
EP   1088878 A1   4/2001
EP   1170352 A2   1/2002

* cited by examiner

LIQUID CRYSTAL COMPOSITION, LIQUID CRYSTAL ALIGNMENT MIXTURE AND LIQUID CRYSTAL DISPLAY DEVICE

FIELD OF THE INVENTION

The present invention relates to a liquid crystal composition, and more particularly to a liquid crystal composition having liquid crystal molecules with difluoroalkenyl group, a liquid crystal alignment mixture and a liquid crystal display device.

BACKGROUND OF THE INVENTION

Liquid crystal display (LCD) is a panel display device which uses the character of liquid crystal material to display the image. It has the advantages of lightweight, low driving voltage and low power consumption while comparing with other types of display. Thus, the LCD has become the major product in the consumer market.

In general, the technology parameter for estimating the LCD comprises contrast, brightness, response time and viewing angle. At present, the liquid crystal panel containing fast response liquid crystal composition is the main solution to improve the response time of LCD.

Furthermore, please refer to FIG. 1. FIG. 1 shows a diagram of the liquid crystal alignment process of the liquid crystal panel made by the fast liquid crystal composition. The fast response liquid crystal mixture 30' comprises one or more types of conventional liquid crystal molecules 31' and 33' of the liquid crystal composition and a polymerizable monomer (Reactive Monomer, RM) 32'. One drop fill (ODF) technology is a process for distributing the liquid crystal mixture 30' onto an alignment film 20' of the substrate 10', and then the steps of applying voltage, the first ultraviolet light exposure and the second ultraviolet light exposure are used to complete the alignment process. As can be seen from FIG. 1, after the completion of the alignment, there is still a considerable number of the RM 32' remained in the liquid crystal mixture 30'. In order to achieve fast response, the liquid crystal mixture 30' typically adopts the liquid crystal molecules having double bonds to which the polymerizable monomer RM 32' is more likely to be bonded in the process of alignment, so that the obtained liquid crystal panel exists the problem of image sticking.

It is therefore tried by the inventor to develop a liquid crystal composition which is able to reduce the polymerization reaction between RM and liquid crystal molecules to solve the problems existing in the conventional technology that cannot prevent image sticking, as described above.

SUMMARY OF THE INVENTION

Therefore, a first object of the present invention is to provide a liquid crystal composition for reducing the polymerization reaction of the liquid crystal molecules with the polymerizable monomer in the polymer alignment process to enhance the polymer generation of the polymerizable monomer with the alignment film, so as to solve the residual of the polymerizable monomer within the liquid crystal molecules, thereby improving the image sticking phenomenon.

To achieve the above object, the present invention provides a liquid crystal composition which comprises one or more types of first liquid crystal molecules with a difluoroalkenyl group (i.e. substituent) and one or more types of second liquid crystal molecules for vertical alignment.

In one embodiment of the present invention, the first liquid crystal molecules have the following formula (1);

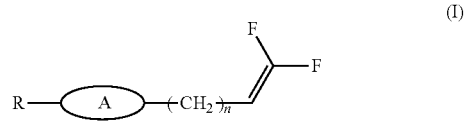

wherein the A group represents at least one six-membered ring, R represents n-pyopylgroup, and n=1 or 2, In one embodiment of the present invention, the second liquid crystal molecules are substituted only by an alkyl group and have the following formula (II):

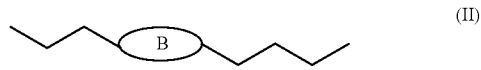

wherein the B group is a hard core comprising at least one six-membered ring.

In one embodiment of the present invention, the liquid crystal composition is distributed by a polymer alignment process.

Furthermore, another embodiment of the present invention provides a liquid crystal mixture for a polymer alignment process, which is used for distribute the liquid crystal molecules onto a surface of an alignment film, and comprising: one or more types of first liquid crystal molecules with a difluoroalkenyl group, one or more types of second liquid crystal molecules for vertical alignment and a polymerizable monomer.

In one embodiment of the present invention, the weight ratio of the first liquid crystal molecules is 0.1-20%, the weight ratio of the second liquid crystal molecules is 80-99.0%, and the weight ratio of the polymerizable monomer is 0.015-0.5%.

In one embodiment of the present invention, the polymerizable monomer is a photo-reactive monomer.

In one embodiment of the present invention, the polymerizable monomer having a methacrylic group.

In one embodiment of the present invention, the polymerizable monomer has the following general formula (III):

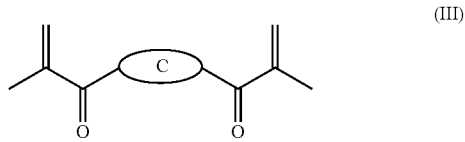

wherein the C group is a hard core containing at least one six-membered ring.

In one embodiment of the present invention, an alignment polymer is formed between the polymerization monomer and the alignment film by a methylacrylic group.

In one embodiment of the present invention, the alignment film comprises polyimide.

A further another embodiment of the present invention provides a liquid crystal panel, which comprises: a first substrate having a first alignment film, a second substrate having a second alignment film, and a liquid crystal material filled between the first substrate and the second substrate, wherein the liquid crystal material comprises one or more types of first liquid crystal molecules with a difluoroalkenyl group (i.e. substituent) and one or more types of second liquid crystal molecules for vertical alignment.

In one embodiment of the present invention, the first substrate is a color filter substrate.

In one embodiment of the present invention, the second substrate is a thin film transistor array substrate.

Compared with the prior art, the liquid crystal composition of the present invention can reduce the reaction probability between the double bonds of the liquid crystal molecules and a polymerizable monomer due to the steric effect of the difluoroalkenyl groups, so as to solve the problems of image sticking in prior art.

The content of the present invention can be more fully understood hereinafter by referring to the following detailed description of preferred embodiment and the accompanying drawings, as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, the preferred embodiments are used to describe and understand the present invention, but the present invention is not limited thereto.

Figure 1:
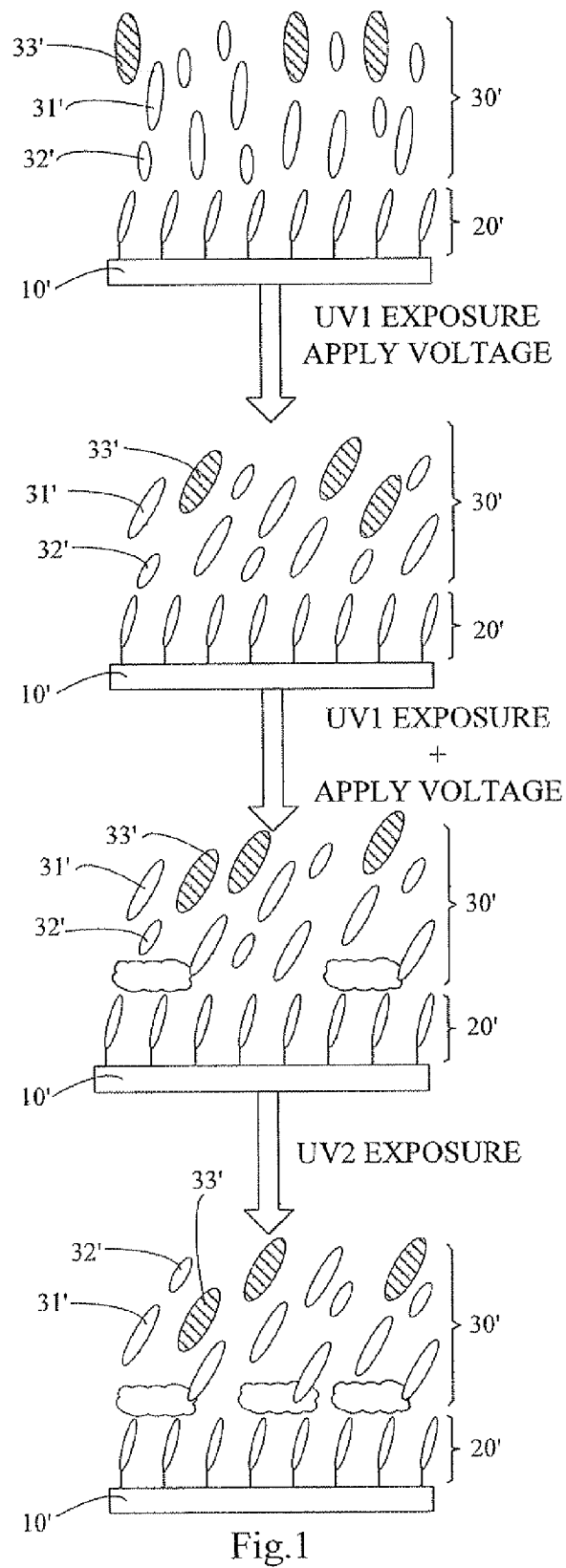
FIG. 1 is a diagram to show a polymer alignment process of a liquid crystal panel made by a traditional fast liquid crystal composition.
Figure 2:
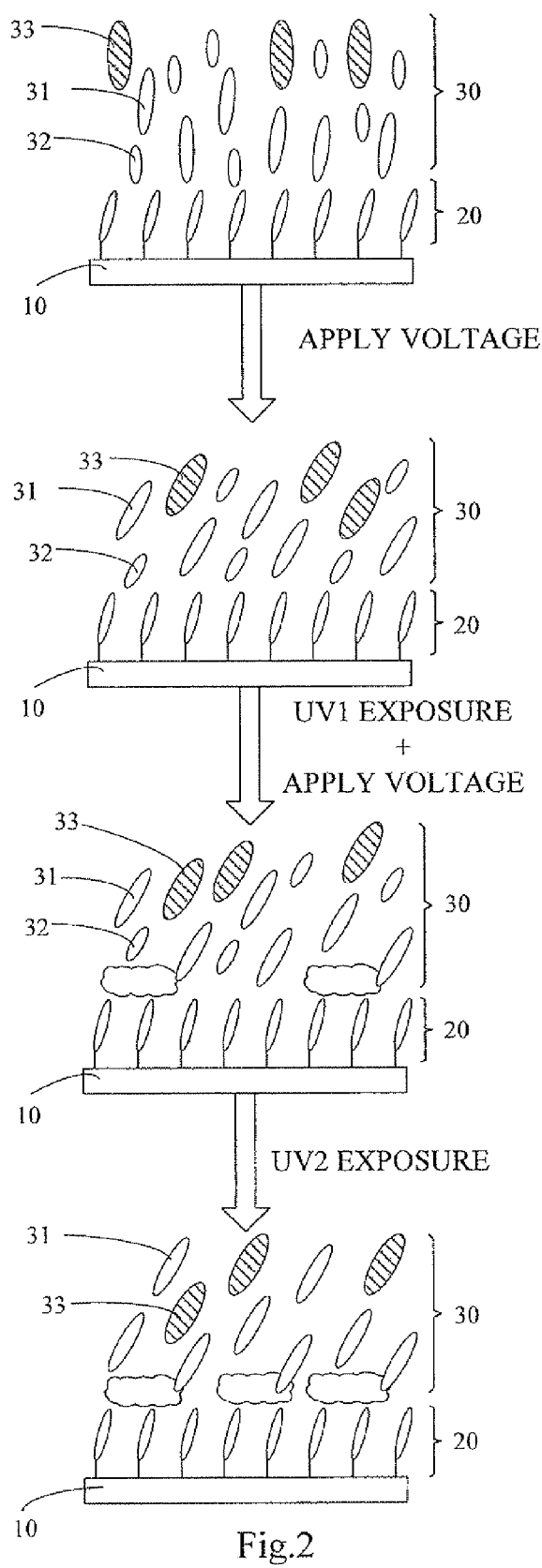
FIG. 2 is a diagram to show a polymer alignment process of a liquid crystal panel made by a liquid crystal composition according to a preferred embodiment of the present invention.

Referring now to FIG. 2, a polymer alignment process of a liquid crystal panel made by a liquid crystal composition according to a first embodiment of the present invention is illustrated. As shown, the first embodiment of the present invention mainly fills a liquid crystal mixture 30 between a first substrate 10 and a second substrate (not shown) after a step of one drop fill (ODF) process, wherein the liquid crystal mixture 30 comprises first liquid crystal molecules 33, second liquid crystal molecules 31 and polymerizable monomers 32. By applying voltage to the first liquid crystal 33, the second liquid crystal 31 and the polyerizable monomer 32 to make them rotate a certain angle, a first UV light exposure is done, wherein the polymerizable monomers 32 will react with the polyimide on the surface of an alignment film 20 to generate polymer. Next, the second UV light exposure is done, and thus the remainder of the polymerizable monomer 32 will react again. As shown in the last state of FIG. 2, there is almost no remainder of the polymerizable monomer 32, so as to achieve the object of improving the image sticking.

Figure 3:
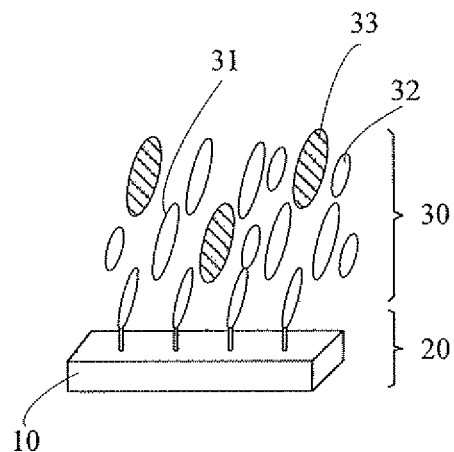
FIG. 3 is a schematic view of a liquid crystal alignment mixture according to a preferred embodiment of the present invention.

Please refer to FIG. 3, a preferred embodiment according to the present invention provides a liquid crystal mixture 30 comprising first liquid crystal molecules 33 and second liquid crystal molecules 31 and polymerizable monomers 32. The first liquid crystal molecules 33 with a difluoroalkenyl group (i.e. substituent) can be used as a diluent. having the following formula (I), and suitably distributed in the liquid crystal mixture 30:

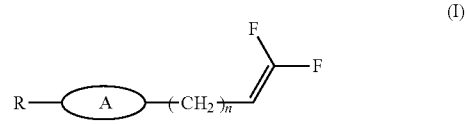

Wherein the A group represents at least one six-membered ring, and the structure is for example a

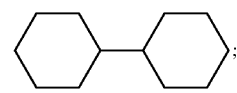 [SMILES: C1CCC(C2CCCCC2)CC1]

R represents n-propyl group, and n=1 or 2. The fbrmula (I) can he a molecule of

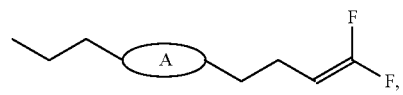

wherein R is n-propyl group and n=2.

The first liquid crystal molecules 33 is for example

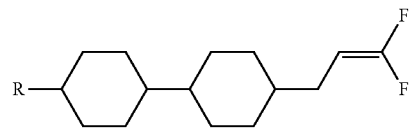

when the abovementioned formula (I) has n equal to 1 and

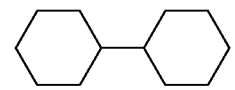 [SMILES: C1CCC(C2CCCCC2)CC1]

as the A group, which can be prepared by adding 0.2 mol of sodium difluorochloroacetate (CF$_2$ClCOONa), 0.2 mol of triphenylphosphine (PPh$_3$), 0.2 mol of 2-(4'-alkyl-bicyclohexyl) acetaldehyde and 500 ml of dimethylformamide (DMF) in a 1000 ml reaction flask, reacting at 80° C. for 4 hours. The reaction mixture was then poured into water, and extracted with ethyl acetate, wherein the mixed organic layer is washed by water until neutral, and then dried and treated by rotary evaporation. The remainder is then subjected to column chromatography to obtain 0.1 mol of the product, and the yield thereof is 50%. The relevant reaction formula is listed, as follows:

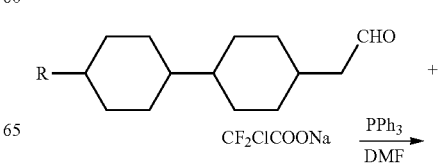

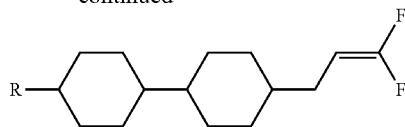

Furthermore, the second liquid crystal molecules 33 are the liquid crystal molecules without double bond substituent, i.e. the liquid crystal molecules are only substituted by alkyl group, for example, the liquid crystal molecules for conventional vertical alignment (VA-LC) having the formula (II), as below:

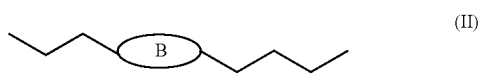

wherein the group B is a hard core comprising at least one six-membered ring, and the B group may be substantially the same as the A group of the first liquid crystal molecules 33.

Further, the polymerizable monomer 32 may be a light-reactive monomer, preferably a polymerizable monomer having a methacrylic group and having the following formula (III):

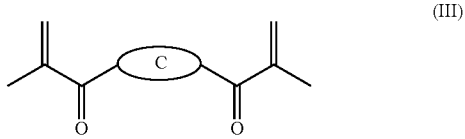

wherein the C group is a hard core comprising at least one six-membered ring, and the C group is substantially the same as the A group of the first liquid crystal molecules 33 or the B group of the second liquid crystal molecules 31.

According to a preferred embodiment of the present invention, an alignment film 20 comprising polyimide can react with the polyerizable monomer 32 to generate an alignment polymer.

According to a preferred embodiment of the present invention, the liquid crystal mixture comprises the first liquid crystal molecules 33 in a weight ratio of 0.1-20%, the second liquid crystal molecules 31 in a weight ratio of 80-99.0%, and the polymerizable monomer 32 in a weight ratio of 0.015-0.5%.

Figure 4:
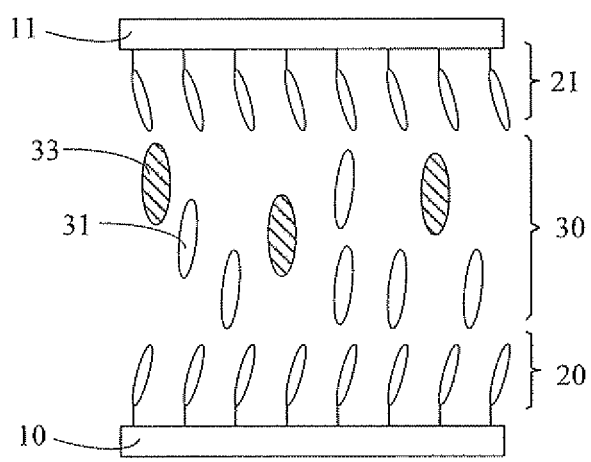
FIG. 4 is a schematic view of a liquid crystal panel comprising the liquid crystal composition according to a preferred embodiment of the present invention.

Please refer to FIG. 4 which shows a liquid crystal panel according to a second embodiment of the present invention. A liquid crystal panel includes a first substrate 10 having a first alignment film 20, a second substrate 11 having a second alignment film 21 and a liquid crystal composition filled between the first substrate 10 and the second substrate 11. The liquid crystal composition is distributed onto a surface of the first alignment film 20 and a surface of the second alignment film 21. The first substrate 10 may be a color filter substrate, and the second substrate 11 may be a thin-film transistor array substrate. The first alignment film 20 and the second alignment film 21 are vertical alignment films.

According to a preferred embodiment of the present invention, a liquid crystal composition of the present invention comprises one or more types of a first liquid crystal molecules 33 with a difluoroalkenyl group and one or more types of a second liquid crystal molecules 31 without double bond substituent, i.e. only having an alkyl group. Due to the steric effect of difluoroalkenyl group carried by the first liquid crystal molecule 33, it is effective to prevent the double bonds of the liquid crystal molecules from reacting with the polymerizable monomer 32, so as to solve the image sticking of the prior art.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal alignment mixture for a polymer alignment process, distributing liquid crystal molecules onto a surface of an alignment film, and comprising:
a liquid crystal material consisting of at least one first liquid crystal molecule with difluoroalkenyl group and at least one second liquid crystal molecule for vertical alignment; and
a polymerizable monomer;
wherein the first liquid crystal molecule has the following formula (I):

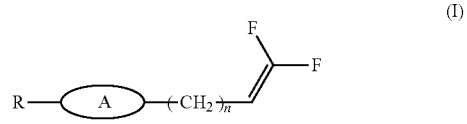

the A group represents at least one six-membered ring, R represents n-propyl group, and n=1 or 2;
the second liquid crystal molecule has the following (II);

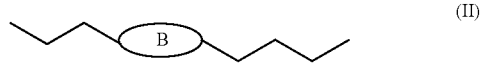

the B group represents at least one six-membered ring; and
wherein the weight ratio of the first liquid crystal molecule is 0.1-20%, the weight ratio of the second liquid crystal molecule is 80-99.0%, and the weight ratio of the polymerizable monomer is 0.015-0.5%.

2. The liquid crystal alignment mixture according to claim 1, wherein the polymerizable monomer is a photoreactive monomer with methacrylic group.

3. The liquid crystal alignment mixture according to claim 2, wherein the polymerizable monomer has the following formula (III):

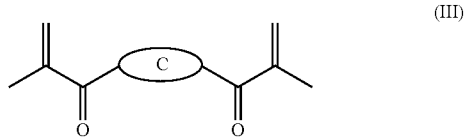

wherein the C group represents at least one six-membered ring.

4. The liquid crystal alignment mixture according to claim 1, wherein the polymerizable monomer is polymerized with the alignment film through the methacrylic group to generate an alignment polymer.

5. The liquid crystal alignment mixture according to claim 4, wherein the alignment film comprises polyimide.

* * * * *